April 11, 1961 F. DAVID ET AL 2,979,709

REAL TIME BINARY CODED DECIMAL-TO-DECIMAL CONVERTER

Filed Nov. 12, 1958 2 Sheets-Sheet 1

INVENTOR.
ARTHUR R. PHIPPS
FREDDY DAVID
BY
Richard G. Stahr
ATTORNEY

United States Patent Office 2,979,709
Patented Apr. 11, 1961

2,979,709

REAL TIME BINARY CODED DECIMAL-TO-DECIMAL CONVERTER

Freddy David, Henrietta, and Arthur R. Phipps, West Webster, N.Y., assignors to General Dynamics Corporation, Rochester, N.Y., a corporation of Delaware Filed Nov. 12, 1958, Ser. No. 773,452
4 Claims. (Cl. 340—347)

The subject invention relates to a translator device for converting serial binary coded decimal signals to a decimal pulse train and, more specifically, to a device for converting serial binary coded decimal signals to a decimal pulse train in real time.

With equipment designed for the use of information expressed in binary form, it is often desirable to provide for the visual display of certain characters, usually decimal digits, through the medium of illuminating neon glow discharge tubes formed to the shape of the various decimal numerals. One method of directing the energizing current to the proper glow tube is through the use of beam switching tubes which may be successively stepped from one position to the next through the application thereto of a series of pulses. To provide this series of pulses, it is often desirable to convert the binary coded decimal signals which designate any specific numerical digit to a decimal pulse train in which the number of pulses is equal to the numerical digit designated by the binary coded decimal signals.

In prior art devices, this was commonly done through the medium of presetting a flip-flop counter circuit through the application thereto of the binary coded decimal signals, to the base 16 complement of the decimal numeral expressed in binary form and then pulsing the counter back to zero, the number of pulses required to do this being the number which was expressed in binary form. This proved to be a rather cumbersome method which precluded this conversion in real time.

It is, therefore, an object of this invention to provide an improved binary coded decimal-to-decimal converter.

It is another object of this invention to provide an improved device for converting serially binary coded decimal signals to a decimal pulse train in real time.

In accordance with this invention, a translator device for converting binary coded decimal signals to a decimal pulse train is provided wherein a signal produced for each bit position of the binary code group employed in which a selected polarity bit is present is so interconnected with a source of electrical pulses, a plurality of switching circuits of the type which may be rendered conductive through the application thereto to one or more electrical signals and an output circuit in such a manner that a series of pulses equal in number to the decimal number designated by the received binary coded decimal signals is placed upon the output circuit.

Figure 1:
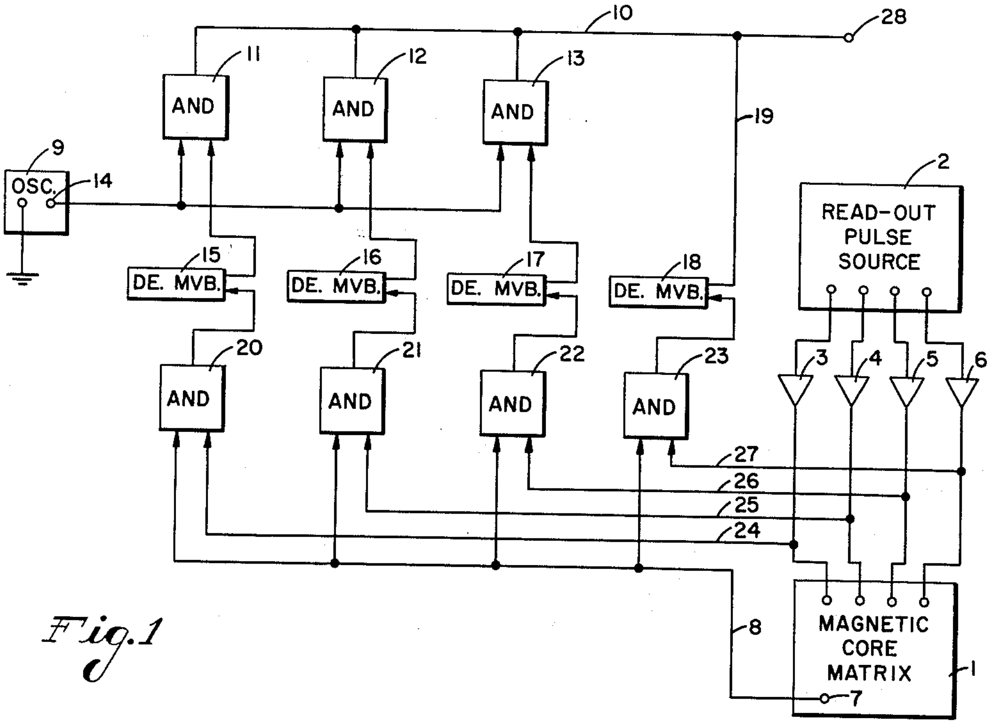
Figure 2:
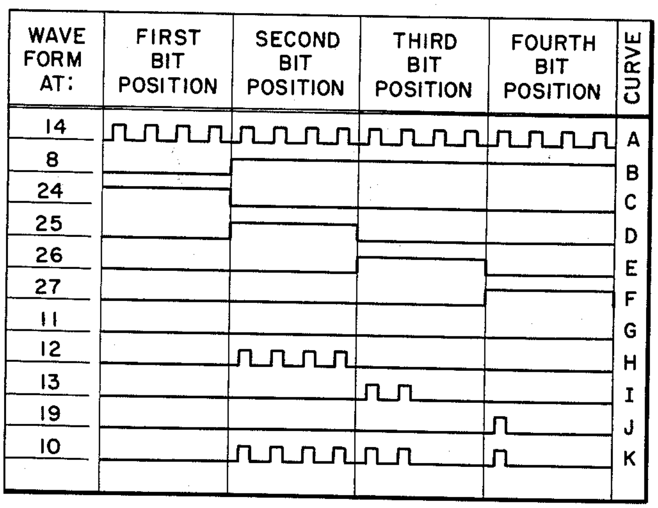
Figure 3:
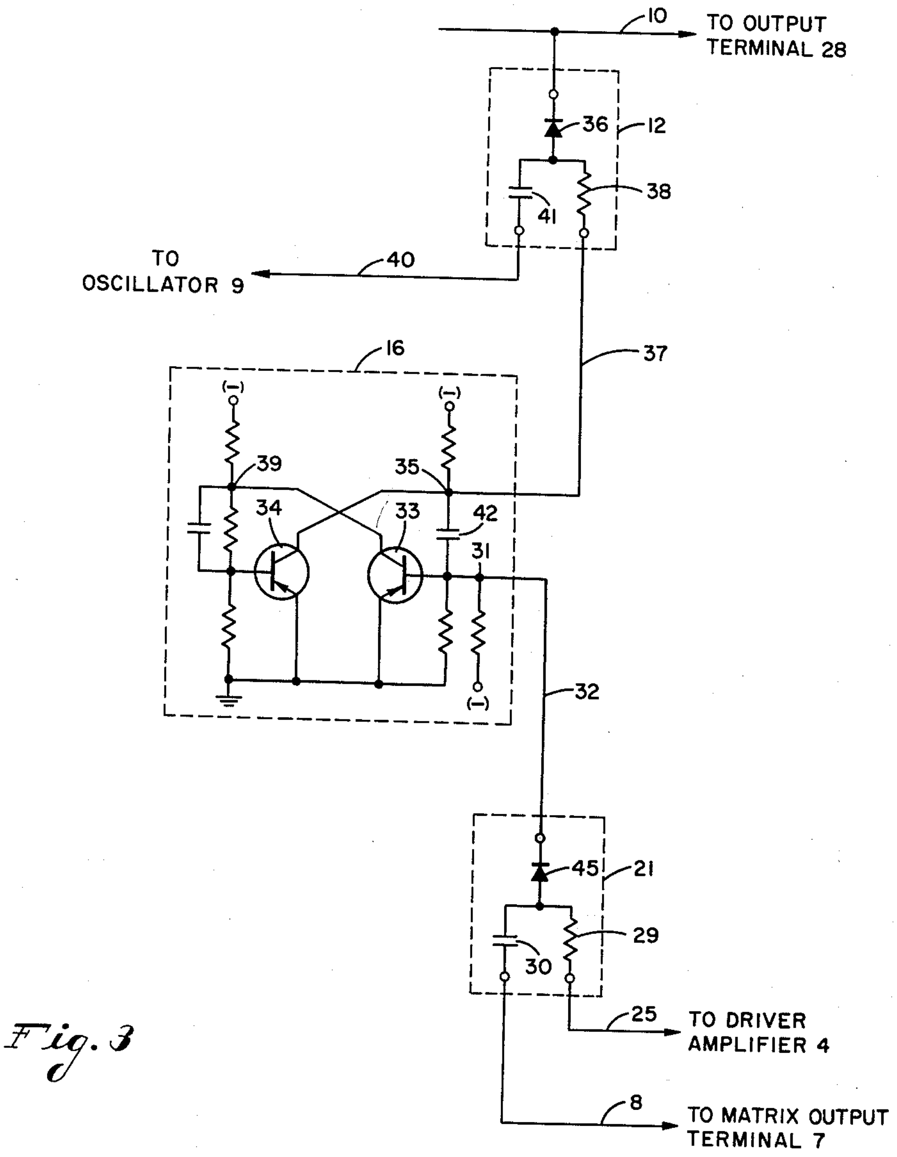

For a better understanding of the present invention, together with further objects, advantages and features thereof, reference is made to the following description and accompanying drawing, in which:

Figure 1 of the drawing illustrates a preferred embodiment of the present invention;

Figure 2 graphically illustrates a group of curves helpful in understanding the operation of the circuit of Figure 1; and Figure 3 illustrates in detail a portion of the circuit shown in block form in Figure 1.

In the binary coded decimal system, each decimal digit may be expressed by a group of four information bits of two different polarities, generally termed "mark" and "space" bits, wherein the presence of either polarity bit, selected to be significant, at any position within the group designates a decimal number to the binary scale of two higher than the same polarity bit occupying the preceding position. That is, a significant bit occupying the first, second, third or fourth position designates the decimal numbers 1, 2, 4 or 8, respectively. Therefore, any decimal digit may be expressed by significant bits occupying a single position or various combinations of positions within the group, the sum of the decimal numbers designated by the significant bits of the combination being the decimal numbers so expressed. A combination of significant bits occupying the first and second positions, for example, expresses the decimal digit 3 or the sum of 1 plus 2. Either of the end bit positions of the four-bit-per-group code, of course, may be designated the "first" position and the presence of a significant bit in this position is generally of the highest order.

For purposes of illustrating this invention, and in no way intending or inferring that it be limited thereto, it will be assumed that the "mark" polarity bits have been selected to be the significant bits and are evidenced by the presence of a signal while the "space" polarity bits are evidenced by the absence of the signal.

Although any suitable source of binary coded decimal signals may be employed without departing from the spirit of this invention, a magnetic core memory matrix, the details of which are well known in the art and form no part of this invention, will be assumed to be the source of binary coded decimal signals and is illustrated in block form in Figure 1 by reference numeral 1. To provide readout energy, a source of readout pulses is provided and, since the details form no part of this invention, is illustrated in block form in Figure 1 by reference numeral 2. The readout pulses from source 2 are directed to respective columns of magnetic cores in matrix 1, each of which corresponds to a respective bit per position in the binary coded decimal group, through respective individual driver amplifiers illustrated in Figure 1 at 3, 4, 5 and 6. As these amplifiers may also be conventional, they have been herein illustrated in block form. Although, for proper readout of a magnetic core matrix, another readout pulse source and the associated individual driver amplifiers is required for each row of magnetic members in the matrix, in the interest of reducing drawing complexity and since they do not enter into the explanation of the operation of the device of this invention, they have not been shown.

As the magnetic members of any row of the magnetic core matrix 1 are successively, individually interrogated through the application thereto of coincident readout pulses in a manner well known in the art, the condition of operation of any of these members which is in the condition of operation corresponding to the significant or "mark" bits of the binary code employed is reversed.

Upon each reversal of conditions of operation, therefore, output pulses appear in serial fashion at output terminal 7 of matrix 1, in a manner well known in the art, and are impressed upon lead 8, the input circuit of the device of this invention.

To provide a source of electrical pulses of a frequency greater than the bit rate of the binary coded decimal signals appearing upon input circuit 8, a conventional oscillator may be employed which, since the details are well known in the art and form no part of this invention, is illustrated in block form by reference numeral 9. For purposes of illustrating the operation of the device of this invention, it will be assumed that the frequency of oscillator 9 be four times the bit rate of the binary coded signal coded decimal signals to be converted. Therefore, oscillator 9 will produce four output pulses during each bit position as indicated by curve A, Figure 2.

So that the pulses emanating from oscillator 9 may be selectively impressed upon output circuit 10, a plurality of switching circuits, each of the type which may be rendered conductive through the application thereto of one or more electrical signals, are required. For purposes of illustrating this invention and in no way intending or inferring that it be limited thereto, it will be assumed that these switching circuits be conventional AND gates each of which may be rendered conductive through the coincident application thereto of two electrical signals. As AND gate circuits are well known in the art and the details form no part of this invention, they are illustrated in block form in Figure 1 by reference numerals 11, 12 and 13. Each of these AND gate circuits is provided with two input circuit terminals and an output circuit terminal, as indicated. The output terminal 14 of oscillator 9 is connected to one of the input circuit terminals of each of the gating circuits 11, 12 and 13, as shown.

To provide the second electrical signal required to produce conduction through any of gates 11, 12 or 13, during each bit position of the binary coded decimal group in which a "mark" polarity bit is present, a conventional delay multivibrator for each bit position may be employed. As the details of delay multivibrators are well known in the art and form no part of this invention, they are herein illustrated in block form by reference numerals 15, 16, 17 and 18.

By properly interconnecting the delay multivibrators, oscillator 9, gate circuits 11, 12 and 13 and output circuit 10, a number of pulses equal to the decimal digit designated by the received binary coded decimal group may be placed upon output circuit 10 in a manner now to be described.

Delay multivibrator 15 is designed to remain in its unstable state, thereby producing an electrical signal during the first bit position, for a duration of time long enough to permit the conduction of eight pulses from oscillator 9 through gate 11; delay multivibrator 16 is designed to remain in its unstable state, thereby producing an electrical signal during the second bit position, for a duration of time long enough to permit the conduction of four pulses from oscillator 9 through gate 12; delay multivibrator 17 is designed to remain in its unstable state, thereby producing an electrical signal during the third bit position, for a duration of time long enough to permit the conduction of two pulses from oscillator 9 through gate 13 while delay multivibrator 18 is designed to remain in its unstable state, thereby producing an electrical signal during the fourth bit position, for a duration of time equal to one pulse of oscillator 9 which is placed directly upon output circuit 10 through lead 19, as indicated.

So that the respective "mark" information bits of the serial binary coded decimal signals received through input circuit 8 may be directed to that delay multivibrator corresponding to the bit position in which they are present, four AND gates, each of the type which requires the coincident application of two electrical signals thereto to produce connection therethrough, are provided. As the details of these AND gates are well known in the art and form no part of this invention, they are herein illustrated in block form by reference numerals 20, 21, 22 and 23. Input circuit 8 is connected to one of the input circuit terminals of each of these AND gates 20, 21, 22 and 23, as shown. To provide the second coincident signal required to produce conduction through any of these AND gates 20, 21, 22 or 23, the other input circuit terminal of each is connected to the driver amplifier of the respective information bit position to which they correspond. That is, gate 20 is connected to driver amplifier 3, gate 21 is connected to driver amplifier 4, gate 22 is connected to driver amplifier 5, while gate 23 is connected to driver amplifier 6 through leads 24, 25, 26 and 27, respectively. Therefore, as these leads are energized by the same source which energized the respective columns of the magnetic core matrix, lead 24 is energized only during the first bit position, lead 25 is energized only during the second bit position, lead 26 is energized only during the third bit position and lead 27 is energized only during the fourth bit position. In this manner, then, the "mark" information bits of the serial binary coded decimal signals received through input circuit 8 may be effectively directed to the corresponding delay multivibrator. The presence of a "mark" bit in the first bit position will be directed to delay multivibrator 15, a "mark" bit in the second bit position will be directed to delay multivibrator 16, a "mark" bit in the third bit position will be directed to delay multivibrator 17, and a "mark" information bit in the fourth bit position will be directed to delay multivibrator 18 through respective gates 20, 21, 22 and 23 and the connection between the output terminals thereof and the input terminals of these respective delay multivibrators, as indicated.

Assuming for purposes of illustration that the binary coded decimal designation of the decimal digit 7 is received from the magnetic core matrix 1 through input circuit 8 and that the first bit position is of the highest order, a "mark" information bit will appear in each of the second, third and fourth bit positions as indicated by curve B of Figure 2.

Although lead 24 is energized during the first bit position, curve C of Figure 2, gate 20 is not rendered conductive in that there is no "mark" bit present in the first bit position, curve B of Figure 2. As there is no output pulse thereby directed to multivibrator 15, it remains in its stable state and no signal is present coincidentally upon gate 11 with the pulses emanating from output terminal 14 of oscillator 9 and, hence, no output pulses are impressed upon output circuit 10, as indicated by curve G of Figure 2.

During the second bit position, the presence of a "mark" information bit in input circuit 8 and the energization of lead 25, curves B and D, respectively, of Figure 2, places coincident signals upon the input circuit terminals of gate 21, thereby producing an electrical signal output which is directed to delay multivibrator 16, thereby reversing its condition of operation to the unstable state. As has been brought out before, when delay multivibrator 16 is in its unstable state, an electrical signal is produced thereby and impressed upon gate 12 for a duration of time long enough to permit conduction through gate 12 four pulses from oscillator 9 which are placed upon output circuit 10 as shown by curves H and K, respectively, of Figure 2.

During the third bit position, the presence of a "mark" information bit in input circuit 8 and the energization of lead 26 by driver amplifier 5, curves B and E, respectively, of Figure 2, coincident signals are impressed upon the input circuit terminals of gate 22 thereby producing an output signal therefrom which is directed to delay multivibrator 17. This electrical signal reverses the condition of operation of delay multivibrator 17 to its unstable state which, as has been brought out before, produces an output electrical signal which is impressed upon gate 13 for a duration of time long enough to permit the conduction through gate 13 of two pulses from oscillator 9 which are impressed upon output circuit 10 as shown by curves I and K, respectively, of Figure 2.

During the fourth bit position, the presence of a "mark" information bit in input circuit 8 and the energization of lead 27 by driver amplifier 6, curves B and F, respectively, of Figure 2, places coincident electrical signals upon the input circuit terminals of gate 23 thereby producing an output electrical signal therefrom which is impressed upon the input circuit terminal of delay multivibrator 18. As has been brought out before, the presence of this signal upon the input circuit terminal of delay multivibrator 18 reverses its condition of operation to its unstable state in which it remains for a duration of time equal to one pulse for oscillator 9 which is impressed through lead 19 upon output circuit 10 as indicated by respective curves J and K of Figure 2.

In this manner, then, a total of seven pulses is placed upon output circuit 10 and may be taken from output circuit terminal 28 and applied to external equipment, not shown, as required.

Without intending or inferring that this invention be limited hereto, one switching circuitry scheme which was successfully employed in a tested model of a device of this invention is detailed in Figure 3 where like elements have been given like characters of reference. As the circuit details and operation of the switching circuitry involved with each bit position is identical in every respect with that involved with every other bit position, only that circuitry relative to the second bit position is shown, in the interest of reducing drawing complexity.

The driver amplifiers illustrated in block form in Figure 1 by reference numerals 3, 4, 5 and 6 are devices sensitive to the readout pulses emanating from source 2 and produce an output potential signal which is normally negative but which returns to ground as the driver is triggered by a readout pulse. This output potential signal is employed to control current amplifiers, not shown in Figure 1, which produce the necessary readout current for interrogating the cores in the magnetic core matrix 1. The normal negative potential output signal from these drivers biases the associated current amplifiers "off"; however, when triggered by a readout pulse from source 2, the ground potential signal produced thereby biases the associated current amplifiers "on."

The readout pulse for the column of cores in the magnetic matrix 1 which corresponds to the second bit position, triggers driver amplifier 4, thereby producing a zero potential output signal therefrom which not only triggers the associated readout current amplifier "on" but also is applied through lead 25 to diode 45 of gate 21 through resistor 29. As there is a "mark" bit present in this bit poistion in the binary coded decimal representation of the digit 7, the resulting pulse produced in matrix 1 and appearing at output terminal 7 and input circuit 8 is differentiated by capacitor 30 of gate 21. The positive portion of this differentiated pulse is passed through diode 45 of gate 21 and impressed upon the input circuit terminal 31 of delay multivibrator 16 through lead 32. Since the normally negative output potential signals are present at the outputs of the other gates 3, 5 and 6 during this bit position, the diodes corresponding to diode 45 in gates 20, 22 and 23 are back-biased, therefore, the pulse appearing in input circuit 8 is not conducted therethrough.

Delay multivibrator 16 is biased in such a manner that, while in its stable state, transistor 33 is conducting and while in its unstable state transistor 34 is conducting. During the stable state condition of delay multivibrator 16, therefore, point 35 is at a negative potential substantially equal to the negative supply potential. This negtive potential is applied to diode 36 of gate 12 through lead 37 and resistor 38. This negative potential back-biases diode 36, thereby preventing the pulses of oscillator 9 from passing therethrough. However, the positive pulse conducted through gate 21 and applied to input terminal 31 of delay multivibrator 16, in a manner as has just been described, is of sufficient magnitude to bias the base of transistor 33 more positive than the emitter. As this does not satisfy the base-emitter bias requirements for conduction through a type P-N-P transistor, transistor 33 is cut off. As transistor 33 cuts off, point 39, which has been at substantially ground potential during the period of conduction of transistor 33, goes negative, thereby placing a negative bias upon the base of transistor 34. As this negative bias on the base of transistor 34 is of sufficient magnitude to render the base more negative than the emitter, the base-emitter bias requirements for conduction through a type P-N-P transistor is satisfied, thereby rendering transistor 34 conductive. During the period transistor 34 is conducting, point 35 is at substantially ground potential. Therefore, this ground potential is applied to diode 36 of gate 12 through lead 37 and resistor 38 thereby forward-biasing diode 36. With diode 36 forward biased, the pulses of oscillator 9 appearing in lead 40 are differentiated by capacitor 41, the positive portion being passed through diode 36 to the output circuit 10. Since neither delay multivibrators 15, 17 nor 18 have had their condition of operation triggered to the unstable state during this bit position, the corresponding diodes in gates 11 and 13 are back-biased which prevents the pasasge therethrough of the pulses appearing from oscillator 9 on lead 40 for the same reasons as previously given in regard to gate 12.

As has previously been brought out, delay multivibrator 16 remains in its unstable state of operation for a duration of itme long enough to permit the passage of four pulses from oscillator 9 through gate 12 to output circuit 10. At the conclusion of this time duration, determined by the time constant of capacitor 42, transistor 33 again becomes conductive, extinguishing transistor 34 as point 39 is returned to substantially ground potential, thereby removing the negative bias from the base of transistor 34. As delay multivibrator 16 returns to its stable condition of operation, point 35 assumes a negative potential substantially equal to the supply potential which again back-biases diode 36 through lead 37 and resistor 38, preventing the further passage of pulses therethrough.

During the next bit position, in which there is a "mark" information bit present in the binary coded decimal representation of the digit 7, this same sequence of events takes place through gate 22, delay multivibrator 17, and gate 13 and so on through each bit position.

While specific polarities have been outlined in the opertion of the circuitry herein illustrated, it is to be specifically understood that polarities may be changed or alternate methods of gating may also be employed, without departing from the spirit of this invention.

In the binary coded decimal system for designating the numerical digits, a significant or "mark" information bit will appear in the first or $2^3$ position only when the digits 8 or 9 are designated; therefore, with the presence of a "mark" bit in the first bit position there will never be a "mark" bit in the second bit position. In view of this, therefore, flip-flop 15 may be designed to remain in its unstable state, thereby producing an electrical signal which is impressed upon one of the input terminals of gate 11 for a duration of time long enough to permit eight pulses from oscillator 9 to be passed through gate 11 and impressed upon output circuit 10. Should the binary coded decimal designation of the digit 8 be received, the coincident presence of a signal at both input terminals of gate 20, through input circuit 8 and line 24, would produce an output signal therefrom which would trigger flip-flop 15 to its unstable state for a period of time long enough to permit the passage of eight pulses from oscillator 9 through gate 11 to output circuit 10 and a "mark" bit would appear in none of the remaining positions. As the binary coded decimal designation of the decimal digit 9 is the presence of a "mark" bit in both the first and fourth bit positions, eight pulses from oscillator 9 would be passed through gate 11 to output circuit 10 in the same manner as previously described in regard to the digit 8 while the ninth pulse would be impressed on output circuit 10 through the action of flip-flop 18 as has previously been described in regard to decimal digit 7.

While the switching circuits in the description of this preferred embodiment have been assumed to be gate circuits, it is to be specifically understood that other forms of switching circuits which are sensitive to one or more signals may also be employed. For example, gates 11, 12, 13, 20, 21, 22 and 23 may be replaced by transistor devices connected to perform switching operations through the application of an electrical signal to their respective base electrodes in a manner well known in the art. The delay multivibrators 15, 16, 17 and 18, likewise, may be replaced with other forms of electronic circuitry which will produce the required output signals upon the application thereto of an electrical signal to their respective input circuits in a manner as has been described herein.

While a preferred embodiment of this invention has been shown and described, it will be obvious to those skilled in the art that various modifications and substitutions may be made without departing from the spirit of this invention which is to be limited only within the scope of the appended claims.

What is claimed is:

1. A translator device for converting serial binary code signals into a train of pulses equal in number to that manifested by the binary code signals, said device comprising in combination with a source of binary code signals, a pulse source operating at a frequency equal to $2^n$ times the bit rate of the binary code signals to converted, wherein $n$ is a first integer at least equal to 1, a group of $k$ first means respectively associated with each bit position, wherein $k$ is a second integer having a value $(n+1)\geqq k>1$, a first of said first means associated with the least significant bit position producing an output pulse having a duration substantially equal to the duration of a pulse from said pulse source in response to said least significant binary code signal having a given polarity, a second of said first means associated with the next to the least significant bit position producing an output pulse having a duration sufficient for said pulse source to produce only two successive pulses in response to said next to the least significant binary code signal having said given polarity, each of the other first means, if any, producing an output pulse having a duration sufficient for said pulse source to produce double the number of successive pulses as that produced during the duration of the output pulse of the next preceding one of said first means in response to the binary code signal corresponding to that first means having said given polarity, an output conductor, means for applying the output pulse of the first of said first means directly to said output conductor, second means associated with each of said first means except said first of said first means for producing an output in response to both first and second inputs being applied thereto, means for applying pulses from said pulse source as said first input to each of said second means, means for individually applying the respective output pulses of each of said first means as said second input to the corresponding one of said second means, and means for applying the output of each of said second means to said output conductor.

2. The translator device defined in claim 1, wherein each of said first means includes normally off AND gate means and a delay multivibrator having the output of said AND gate means applied as an input thereto, means for applying said binary code signals as an input to every one of said AND gate means, and means for opening each AND gate means only during its associated bit position.

3. The translator device defined in claim 2, wherein each of said second means includes second normally off AND gate means.

4. The translator device defined in claim 1, wherein said binary code signals are binary coded decimal signals which are to be converted to a decimal pulse train, and wherein $n$ is equal to 3 and $k$ is equal to 4.

References Cited in the file of this patent

UNITED STATES PATENTS

| | | |
|---|---|---|
| 2,658,139 | Abate | Nov. 3, 1953 |
| 2,894,254 | Mork | July 7, 1959 |